UNITED STATES PATENT OFFICE.

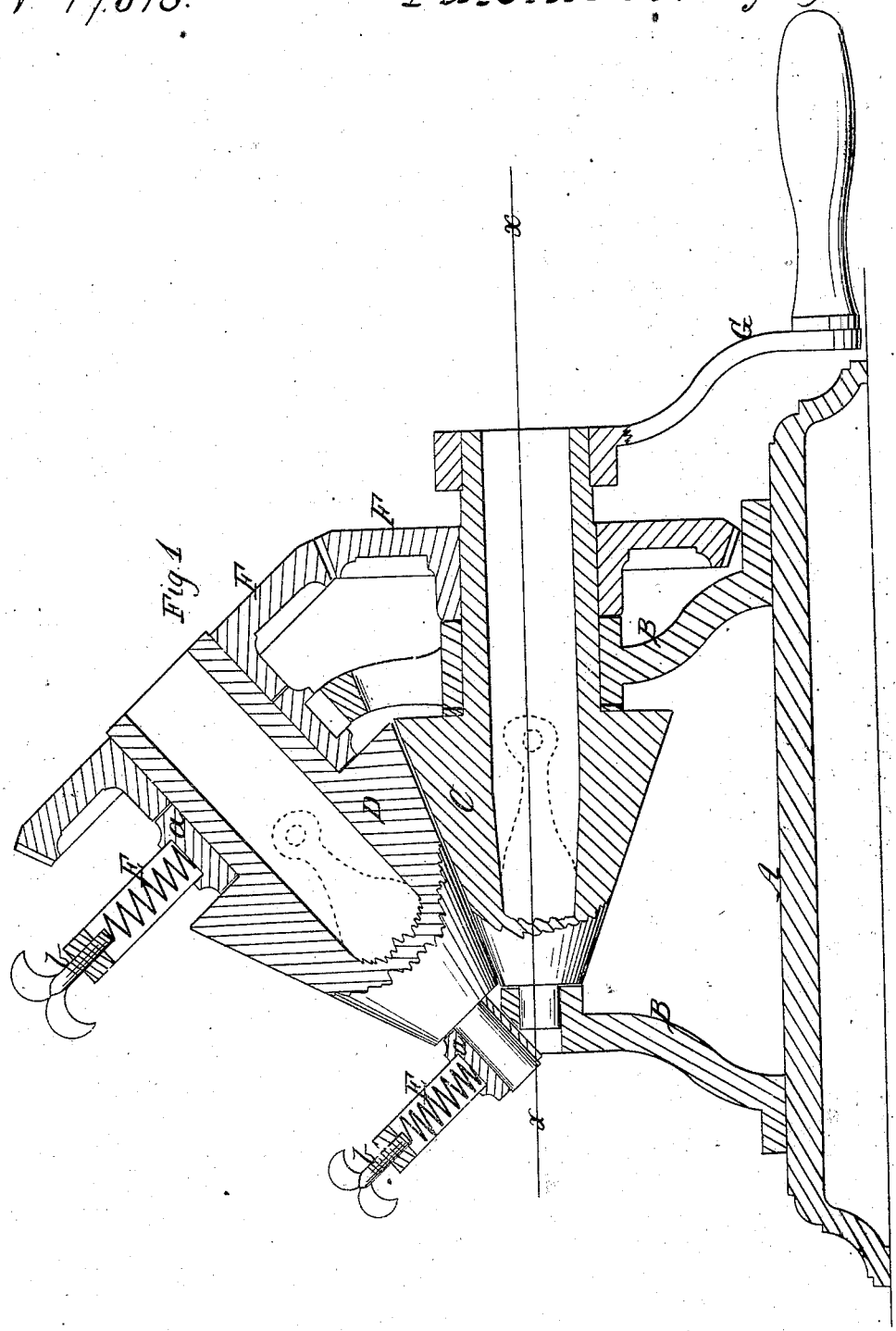

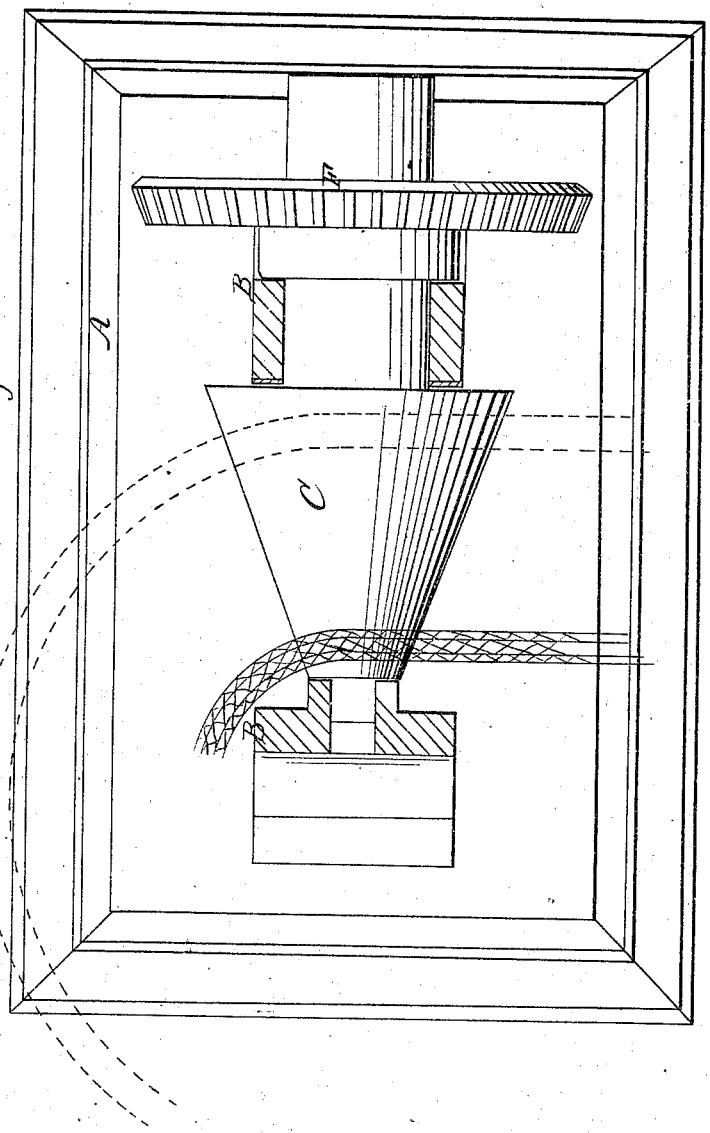

GEORGE CORNWALL, 2D, OF MILFORD, CONNECTICUT.

METHOD OF TREATING STRAW BRAID FOR HATS, &c.

Specification of Letters Patent No. 17,318, dated May 19, 1857.

*To all whom it may concern:*

Be it known that I, GEORGE CORNWALL, 2d, of Milford, in the county of New Haven and State of Connecticut, have invented a new and Improved Method of Treating Straw Braid for Hats; and I do hereby declare that the following is a full, clear, and exact description of the same, reference being had to the annexed drawings, making a part of this specification, in which—

Figure 1 is a longitudinal vertical section of a machine which is used in connection with my improvement, the plane of section passing through the center. Fig. 2 is a horizontal section of the uprights of the same; (*x*) (*x*), Fig. 1, showing the plane of section; the lower cone not being bisected.

Similar letters of reference indicate the same parts in both figures.

My invention consists in simultaneously beveling, curving, stretching, and smoothing the braid by passing it between conical rollers in the manner hereinafter described.

To enable others skilled in the art to fully understand and make use of my invention, I will proceed to describe it.

A, represents a base, on which two uprights B, B, are secured; and C is a conical roller, the journals of which have their bearings in the upper ends of the uprights. The upper ends of the uprights B, B, are bent angularly with the lowest portions, as shown in Fig. 1, and are slotted to receive the journals of a conical roller D, which is precisely similar to the roller C. The journals of the upper roller D are fitted in boxes (*a*), which are allowed to slide freely in the upper bent ends of the uprights B, and have springs E bearing against them; said springs keeping the upper roller pressed against the lower one. The strength of these springs, and the consequent position of the bearings of roller D, when braid is passing through, may be adjusted by screws (*b*). These screws also serve to adjust the bearings of roller D, in such a manner as to bevel the braid. The outer ends of the journals, at the larger ends of the rollers, have each a toothed wheel F attached to them. These wheels gear into each other; and a crank G is attached to the journal of the lower roller. The two rollers may be made hollow or may have openings made longitudinally in them, to receive heaters if necessary.

In the drawing, (*x′*) indicates the heaters. The rollers are constructed of metal, and also the uprights and base. The bearings of the roller C having been suitably adjusted by means of the screws (*b*), the braid (shown in red, Fig. 2) is passed between two rollers by turning the crank G, and as the rollers are of conical form, the edge of the braid nearest the larger ends of the rollers will be compressed more than the opposite edge and thus beveled; and the braid will consequently be curved in circular form, and will be more or less curved according to the distance it is placed from the smaller ends of the rollers. The braid, therefore, is made to conform to the shape of the hat; for instance, the braid for the brim is passed through or between the rollers near their larger ends, so as to form circles of large diameter; and the braid for the crown is passed between the rollers near their smaller ends, so as to form smaller circles. This will be understood by referring to Fig. 2. The degree of bevel given to the braid may be altered by altering the adjustment of the roller C, by means of the screws (*b*). The braid, in passing between the rollers, is also smoothed and stretched. At present, the braid is stretched by the fingers while being sewed together to form the hat. This consumes considerable time, the work is left rough, and no bevel is given to the braid. Indeed, the inner edge of braid, instead of being smoothed and bettered is thickened by being jammed up or crowded by the fingers of the operator.

I am aware that it is common to smooth braid by passing it between plain rollers. I do not claim such rollers. Nor do I claim, broadly, the employment of conical rollers, for curving materials of all descriptions, since they have been heretofore used. An example is seen in E. Carver's patent, 1838, for making circular saws. But

What I claim, and desire to secure by Letters Patent, is:

The method of simultaneously beveling, curving, stretching, and smoothing the braid, as herein described.

GEO. CORNWALL, 2D.

Witnesses:
GEORGE TIBBALS,
SAMUEL B. QUINN.